United States Patent
Gao et al.

(10) Patent No.: US 9,425,458 B2
(45) Date of Patent: Aug. 23, 2016

(54) METHOD FOR MAKING LITHIUM-ION BATTERY ELECTRODE MATERIAL

(75) Inventors: Jian Gao, Beijing (CN); Xiang-Ming He, Beijing (CN); Jian-Jun Li, Beijing (CN); Wei-Hua Pu, Beijing (CN); Jian-Guo Ren, Beijing (CN); Li Wang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 1187 days.

(21) Appl. No.: 12/885,724

(22) Filed: Sep. 20, 2010

(65) Prior Publication Data
US 2011/0236299 A1    Sep. 29, 2011

(30) Foreign Application Priority Data
Mar. 25, 2010 (CN) .................. 2010 1 0132910.7

(51) Int. Cl.
| H01M 4/13 | (2010.01) |
| H01M 4/485 | (2010.01) |
| H01M 4/131 | (2010.01) |
| H01M 4/1391 | (2010.01) |
| H01M 4/62 | (2006.01) |

(52) U.S. Cl.
CPC .............. *H01M 4/485* (2013.01); *H01M 4/131* (2013.01); *H01M 4/1391* (2013.01); *H01M 4/625* (2013.01); *Y02E 60/122* (2013.01); *Y02P 70/54* (2015.11)

(58) Field of Classification Search
CPC ......... H01M 4/13; H01M 4/131; H01M 4/58; H01M 4/1391; H01M 4/485; H01M 4/625; C01G 23/00; Y02E 60/122
See application file for complete search history.

(56) References Cited

U.S. PATENT DOCUMENTS

| 5,015,332 A | * | 5/1991 | Iwaya | ...................... B01D 1/18 |
| | | | | 159/4.2 |
| 8,343,567 B2 | * | 1/2013 | Cahalan et al. | .............. 427/2.13 |
| 8,377,509 B2 | * | 2/2013 | Dobbs et al. | .................. 427/212 |

(Continued)

FOREIGN PATENT DOCUMENTS

| CN | 101373829 | 2/2009 |
| CN | 101378119 | 3/2009 |

(Continued)

OTHER PUBLICATIONS

Jian Ao et al., Influence of carbon additive on the properties of spherical Li4Ti5O12 and LiFePO4 materials for lithium-ion batteries, Ionics, (2010) 16: 417-424.

(Continued)

*Primary Examiner* — Melvin C Mayes
*Assistant Examiner* — Smita Patel
(74) *Attorney, Agent, or Firm* — ScienBiziP, P.C.

(57) ABSTRACT

The present disclosure relates to a method for making an electrode material of lithium-ion batteries. In the method, a lithium source solution and a plurality of titanium source particles are provided. The lithium source solution and the titanium source particles are mixed, wherein a molar ratio of lithium element to titanium element is in a range from about 4:5 to about 9:10, thereby forming a sol. A carbon source compound is dispersed into the sol to form a sol mixture. The sol mixture is spray dried to form a plurality of precursor particles. The precursor particles are heated to form a lithium titanate composite electrode material.

11 Claims, 7 Drawing Sheets

(56) References Cited

U.S. PATENT DOCUMENTS

2001/0031401 A1* 10/2001 Yamawaki et al. ........ 429/231.1
2007/0148545 A1*  6/2007 Amine et al. ............. 429/231.1
2011/0300446 A1   12/2011 Yang et al.

FOREIGN PATENT DOCUMENTS

| CN | 101409341 | 4/2009 |
|---|---|---|
| CN | 100530780 | 8/2009 |
| CN | 101587948 | 11/2009 |
| CN | 101659443 | 3/2010 |
| CN | 101859891 | 10/2010 |

OTHER PUBLICATIONS

Preparation of particulate Li4Ti5O12 having excellent characteristics as an electrode active material for power storage cells, Kiyoshi Nakahara et al., Journal of power sources, 117(2003), 131-136.

* cited by examiner providing a lithium source solution and titanium source particles

↓ mixing the lithium source solution and the titanium source particles, wherein a molar ratio of lithium to titanium is in a range from about 4:5 to about 9:10, thereby forming a sol

↓ dispersing a carbon source compound into the sol to form a sol mixture

↓ spray drying the sol mixture to form precursor particles

↓ heating the precursor particles, thereby forming a lithium titanate composite electrode material

METHOD FOR MAKING LITHIUM-ION BATTERY ELECTRODE MATERIAL

CROSS-REFERENCE TO RELATED APPLICATIONS

This application claims all benefits accruing under 35 U.S.C. §119 from China Patent Application No. 201010132910.7, filed on Mar. 25, 2010, in the China Intellectual Property Office, the contents of which are hereby incorporated by reference.

BACKGROUND

1. Technical Field

The present disclosure relates to methods for making electrode material applied in a lithium-ion battery, and particularly to a method for making a lithium titanate composite electrode material.

2. Description of Related Art

Lithium titanate ($Li_4Ti_5O_{12}$) with spinel structure is a novel electrode material used in energy storage batteries and has received a great deal of interest recently. Lattice parameters of the lithium titanate have only extremely small variations when lithium ions are cycled in and out during a charging and discharging process of the battery. Thus, the lithium titanate has been reported as a "zero strain" electrode material, and has an excellent cycling property. Electrodes made of lithium titanate can undergo many hundreds of cycles without structural disintegration, thereby increasing the lifespan of the batteries, and decreasing an attenuating speed of specific capacity of the electrodes. However, lithium titanate has a lower conductivity, charge, and discharge rate, and tap density than other electrode materials such as lithium manganate.

Presently, different methods are used for solving the above problems include fabricating nanoscale lithium titanate to shorten diffusion paths of lithium ions and increasing the surface area for electrochemical reaction, mixing conductive carbon particles with the lithium titanate powder, or doping metal ions into the lithium titanate. A method for making a composite lithium titanium material includes mixing a solid phase lithium salt, a solid phase titanium dioxide ($TiO_2$), and a dispersing agent according to a certain proportion, thereby forming a mixture. The mixture is then ball milled to form a precursor. A number of lithium titanate particles are fabricated by heating the precursor for a period of time. Furthermore, the lithium titanate particles are coated by a carbon source by using an immersion method, and then the carbon source is pyrolyzed to form a carbon layer coated on surfaces of each of the lithium titanate particles. The conductivity and the discharge rate of the lithium titanate composite material are improved by the addition of the carbon layer.

However, the above precursor is formed by using a solid phase mixing method. The lithium salt and the solid phase titanium dioxide are simply mixed together. As a result, the lithium titanate particles are irregularly shaped and vary in diameter. Thus, the tap density, the fluidity, and the machinability of the lithium titanate composite material are relatively poor.

What is needed, therefore, is to provide a method for making a lithium titanate composite electrode material having high tap density, excellent fluidity, and excellent machinability.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
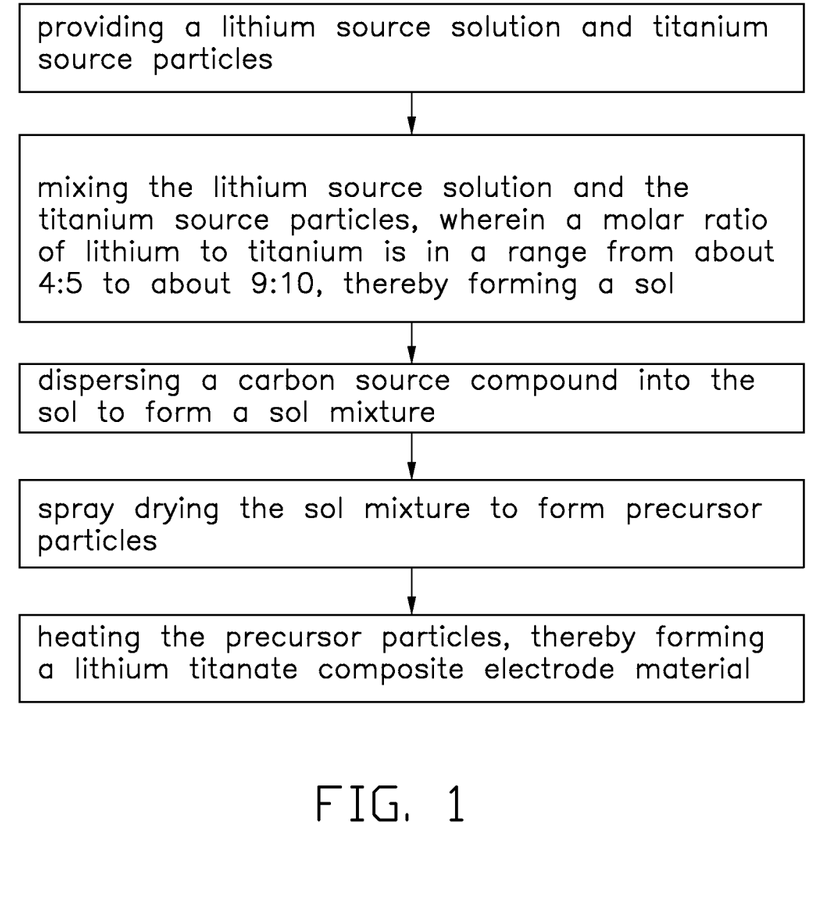
FIG. 1 is a flow chart of one embodiment of a method for making a lithium titanate composite electrode material.
Figure 2:
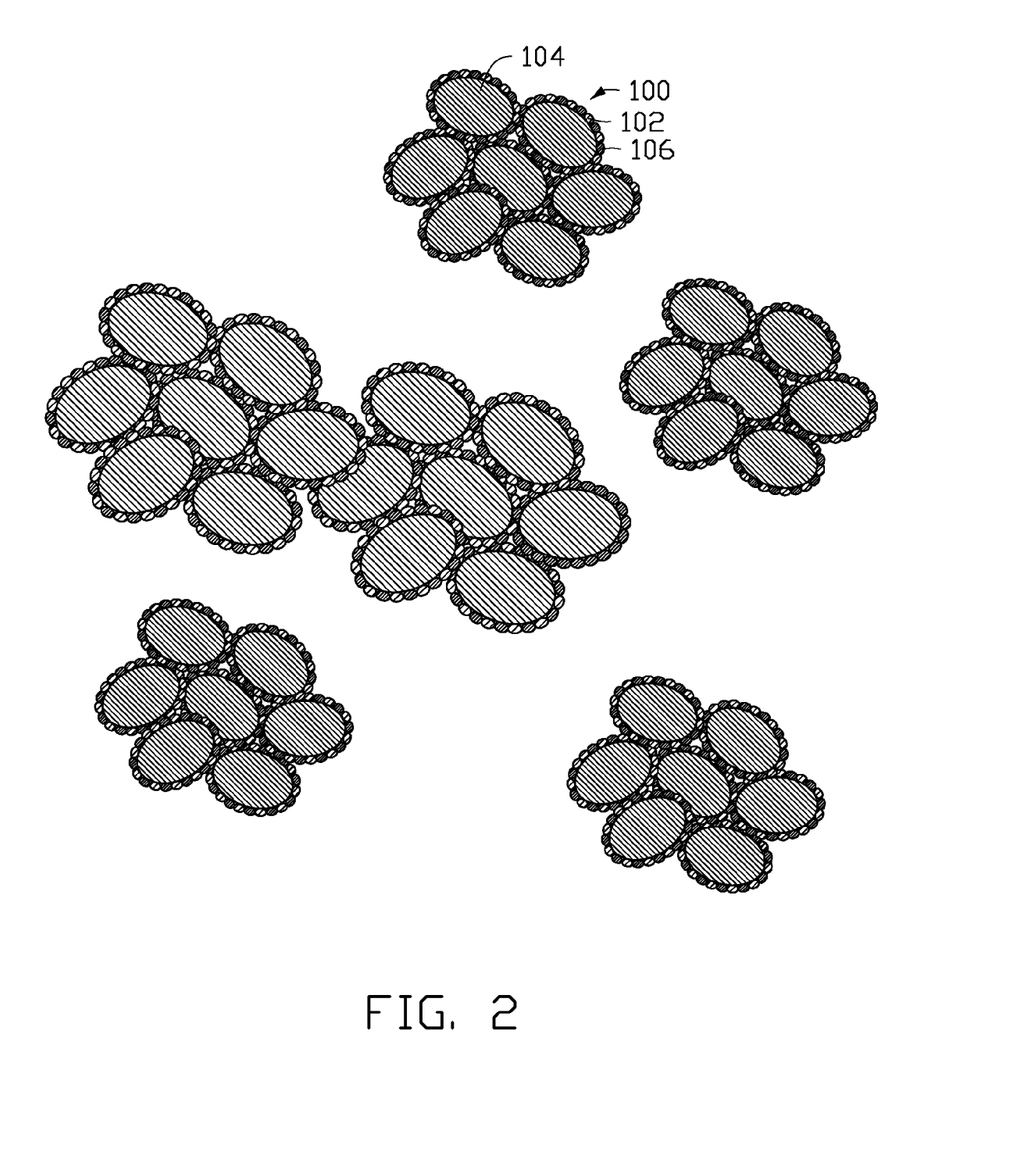
FIG. 2 is a structural schematic view of precursor particles made using the method of FIG. 1.
Figure 3:
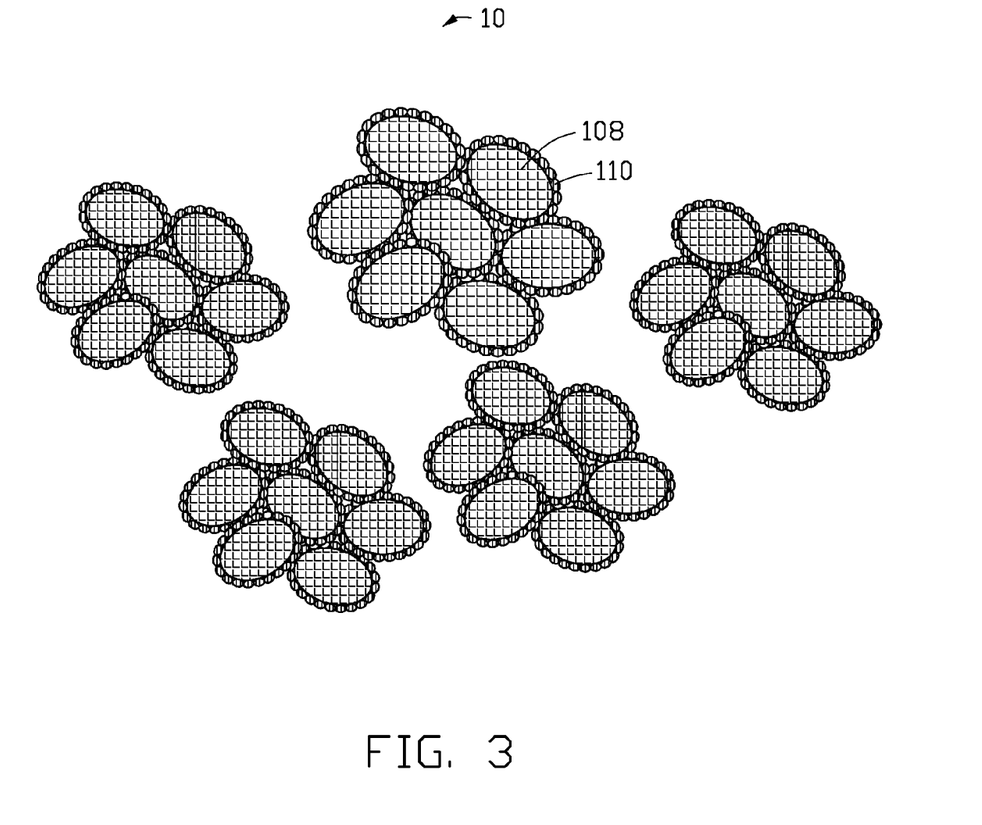
FIG. 3 is a structural schematic view of the lithium titanate composite electrode material made using the method of FIG. 1.

Referring to FIGS. 1, 2, and 3, one embodiment of a method for making a lithium titanate composite electrode material includes the steps of:

S1, providing a lithium source solution and titanium source particles;

S2, mixing the lithium source solution and the titanium source particles, wherein a molar ratio of lithium to titanium is in a range from about 4:5 to about 9:10, thereby forming a sol;

S3, dispersing a carbon source compound into the sol to form a sol mixture;

S4, spray drying the sol mixture to form precursor particles 100;

S5, heating the precursor particles 100, thereby forming a lithium titanate composite electrode material 10.

In step S1, the lithium source solution is formed by dissolving a lithium salt or lithium hydroxide (LiOH) in a solvent. The lithium salt can be soluble and may be, but is not limited to, lithium carbonate, lithium sulfate, lithium nitrate, or lithium chloride. The solvent can be water, ethanol, or acetone. In one embodiment, the solvent is water. The water can be distilled water or deionized water to avoid introducing impurities.

A diameter of each of the titanium source particles is in a range from about 20 nanometers (nm) to about 100 micrometers (μm). The smaller the diameter of the titanium source particles, the higher the uniformity of the sol mixture. In one embodiment, the individual diameters of the titanium source particles range from about 50 nm to about 50 μm. The titanium source particles can be titanium dioxide ($TiO_2$) particles, hydrated titanium dioxide ($TiO_2.H_2O$) particles, or hydroxy titanium oxide ($TiO(OH)_2$) particles. If the titanium source particles are hydroxy titanium oxide particles, a method for making the hydroxy titanium oxide particles can include steps of:

(a) providing a soluble titanium salt and an ammonia;

(b) mixing the ammonia and the titanium salt, thereby inducing a reaction between the ammonia and the titanium salt to form hydroxy titanium oxide particles; and (c) washing the hydroxy titanium oxide particles.

Furthermore, for decreasing the diameter of each of the hydroxy titanium oxide particles, agitation of the ammonia and the titanium salt, can be included in the step (h). The soluble titanium salt can be titanium tetrachloride ($TiCl_4$) or titanyl sulfate ($TiOSO_4$). The amount of ammonia is used to ensure complete precipitation of the titanium element of the soluble titanium salt, and can be suitably excessive. Remaining ions, such as chloride ions and sulfate ions can be washed away, in step (c) to avoid decreasing electrochemical properties of the lithium titanium composite electrode material.

In one embodiment, the lithium source solution is lithium hydroxide solution having a molar concentration of about 0.5 mol/L to about 3 mol/L. The titanium source particles are titanium dioxide particles. The diameter of each of the titanium dioxide particles is smaller than about 50 nm.

In step S2, the sol can be further agitated to uniformly mix the lithium source solution and the titanium source particles. Agitation can be accomplished through mechanical agitation, magnetic agitation, or supersonic dispersion.

In step S3, a quantity of the carbon source compound can be set as a molar ratio of about 1:10 to about 2:1 of the carbon element of the carbon source compound to the titanium element of the titanium source particles. The carbon source compound can be a reductive organic compound and can be dissolved in the lithium source solution, and the carbon source compound can be pyrolyzed to form a carbon residue. The carbon source compound can be saccharose, dextrose, phenolic resin, polyacrylic acid, polyacrylonitrile, polyethyleneglycol, or polyvinylalcohol. In one embodiment, the carbon source compound is saccharose.

Furthermore, a surface modifier can be added into the sol mixture before dispersing the carbon source compound into the sol. A weight of the surface modifier is about 0.01% to about 0.1% of that of the carbon source compound. The surface modifier is an oil-in-water emulsifier. The surface modifier can modify the surfaces of the titanium source particles. Accordingly, the titanium source particles, the lithium salt or lithium hydroxide, and the carbon source compound can be uniformly mixed. In one embodiment, the surface modifier is polysorbate 80 (Tween 80) or Sorbitan Monooleate (Span 80).

Furthermore, the carbon source compound can be uniformly dispersed in the sol mixture by agitating the sol mixture, as accomplished with high speed agitation or ultrasonic dispersion. Thus, the carbon source compound, the lithium salt or lithium hydroxide, and the titanium source particles can be uniformly mixed by the above solid-liquid mixing done in steps S2 and S3.

In step S4, the sol mixture can be spray dried by an airflow spray dryer. The spray dryer includes an atomizer and a peristaltic pump. The atomizer includes a two-fluid nozzle.

Further, the step S4 includes the following substeps:

S41, filling the sol mixture into the spray dryer using the peristaltic pump;

S42, atomizing the sol mixture using the atomizer under a certain air pressure, thereby forming a plurality of vaporific liquid drops; and S43, heating the liquid drops in hot air, thereby forming a plurality of porous spherical precursor particles.

In step S41, the sol mixture is filled in the spray dryer under a hot airflow. Temperature of the hot air can range from about 200 degrees Celsius to about 400 degrees Celsius. In one embodiment, the temperature of the hot air is 300 degrees Celsius. The filling rate of the sol mixture can range from about 5 mL/min to about 40 mL/min. In one embodiment, the filling rate ranges from about 10 mL/min to about 20 mL/min.

In step S42, the air pressure can range from about 0.05 MPa to about 0.2 MPa. In one embodiment, the air pressure is 0.1 MPa. The plurality of vaporific liquid drops have extremely small diameters, so accordingly, the liquid drops have large specific surface areas.

In step S43, rapid heat exchange can occur between the hot air and the vaporific liquid drops. Accordingly, solvent in the liquid drops can be rapidly vaporized, thereby forming porous spherical precursor particles from the liquid drops. After forming the precursor particles, the temperature of the hot air used can range from about 50 degrees to about 150 degrees. In one embodiment, the temperature of the hot air is 100 degrees.

The diameters of the precursor particles can range from about 1 μm to about 10 μm, and the diameter distribution of the precursor particles are uniform. The precursor particles are regular spherical shaped. Fluidity and machinability of the precursor particles are excellent. Referring to FIG. 2, each of the precursor particles 100 includes a plurality of titanium dioxide particles 104. Surfaces of each of the titanium dioxide particles 104 are uniformly wrapped by a plurality of lithium hydroxide particles 102 and a plurality of saccharose particles 106. A plurality of interspaces are defined between the titanium dioxide particles 104, thus, each of the precursor particles 100 is a porous spherical structure or spherical-like structure.

In step S5, the precursor particles 100 are heated in an inert gas from about 2 hours to about 40 hours at a temperature ranging from about 400 degrees Celsius to about 1000 degrees Celsius. In one embodiment, the heating temperature is about 700 degrees Celsius, and the heating time is about 16 hours. Referring to FIG. 3, in the heating process, the titanium dioxide particles 104 and the lithium hydroxide particles 102 in the precursor particles 100 can react to form a plurality of nanoscale lithium titanate particles 108, and the saccharose particles 106 are pyrolyzed to form a carbon layer 110 coating the surfaces of each of the lithium titanate particles 108. Specially, each of the precursor particles 100 includes a plurality of thermal transmission paths composed of the interspaces between the titanium dioxide particles 104. Thus, the titanium dioxide particles 104 and the lithium hydroxide particles 102 can rapidly react to form the lithium titanate particles 108 under a lower heating temperature. In addition, hydrogen and oxygen in the saccharose particles 106 are expelled in a form of carbon dioxide ($CO_2$) and water ($H_2O$). The remaining carbon element is adsorbed on the surfaces of each of the lithium titanate particles 108, under a surface tension, to form the carbon layer 110. The carbon layer 110 can restrain crystal grain growth of the lithium titanate particles 108. Finally, a composite lithium titanate electrode material 10, including a plurality of composite lithium titanate particles, is formed. The composite lithium titanate particles are spherical or spherical-like, similar to the precursor particles 100. Each of the composite lithium titanate particles includes a plurality of nanoscale lithium titanate particles 108 coated by the carbon layers 110.

Figure 4:
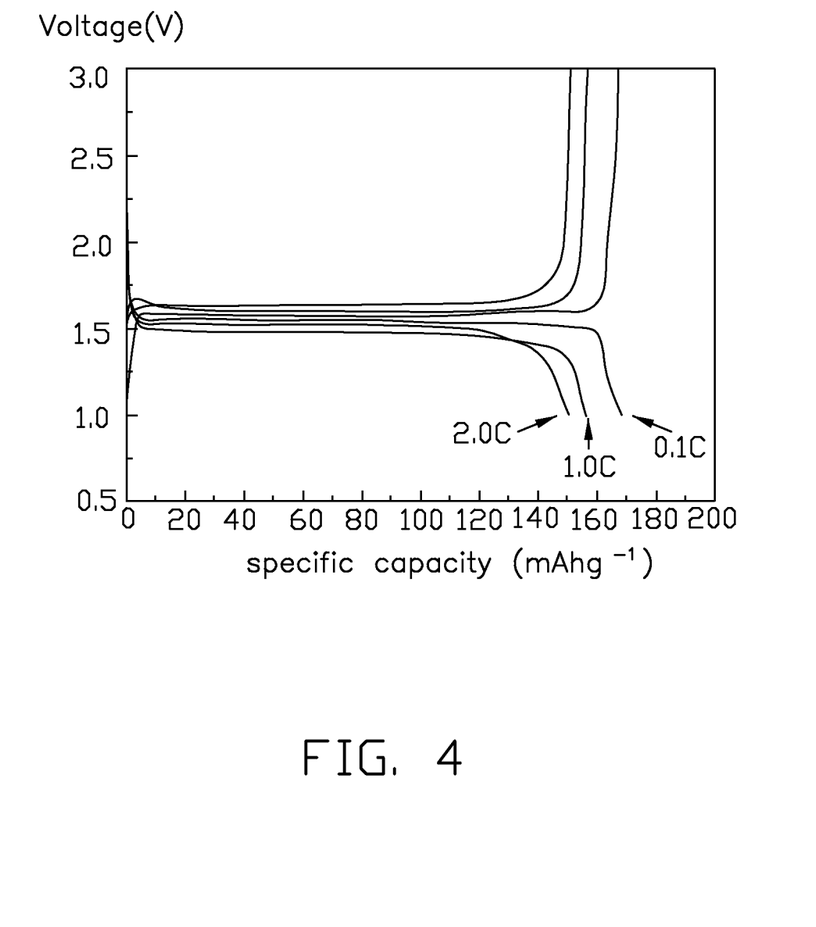
FIG. 4 is a test graph showing first charges/discharges under different rates of a lithium-ion battery using the lithium titanate composite electrode material.
Figure 5:
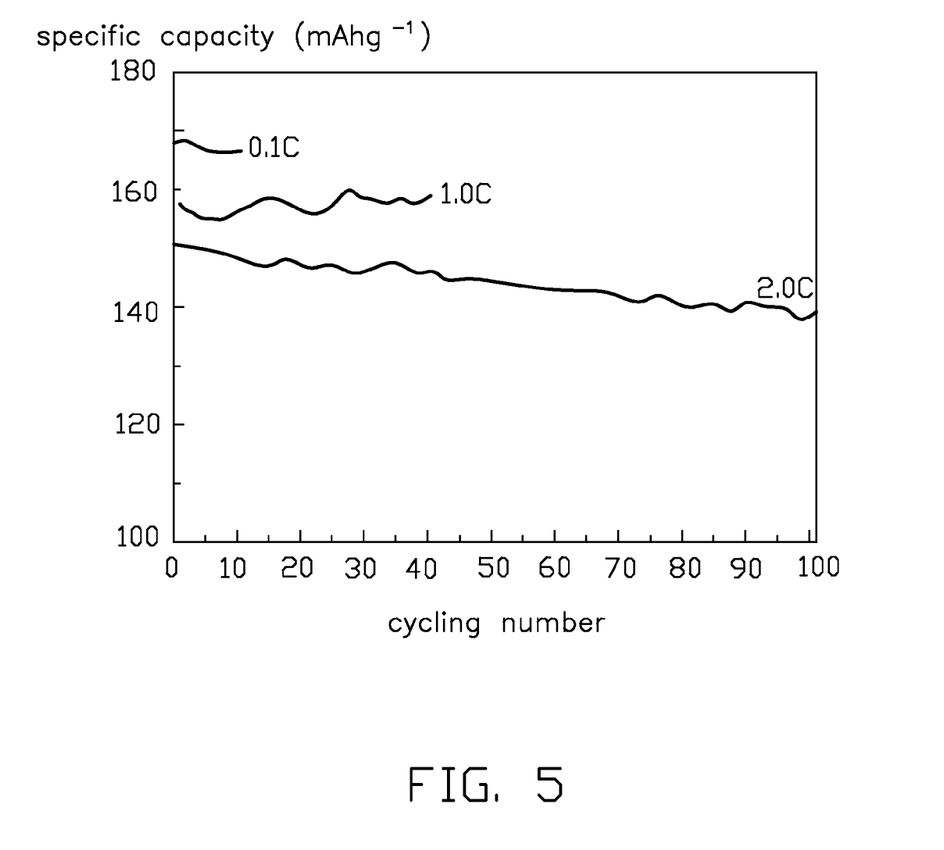
FIG. 5 is a test graph showing cycling performance under different rates, of a lithium-ion battery using the lithium titanate composite electrode material.

The lithium titanate particles 108 are spherical or spherical-like, and the diameters of the lithium titanium particles 108 are small and uniform. Thus, the lithium titanate composite electrode material 10 has a high tap density, excellent fluidity, and excellent machinability. In one embodiment, the tap density of the lithium titanate composite electrode material 10 is about 1.62 $g/cm^3$. If the lithium titanate composite electrode material 10 is used as the cathode material in a battery, the battery will have a high charge-discharge capacity and good cycling performance. Referring to FIG. 4, the specific capacity of initial charge/discharge of the battery under different rates is tested. The specific capacity of the battery is about 170 mAh/g when the rate is 0.1C. The specific capacity of the battery is about 160 mAh/g when the rate is 1C. The specific capacity of the battery is 150 about mAh/g when the rate is 2C. Referring to FIG. 5, the cycling performances of the battery, under different rates (0.1C, 1C, 2C respectively), are tested. The specific capacity loss of the battery is small during cycling.

Figure 6:
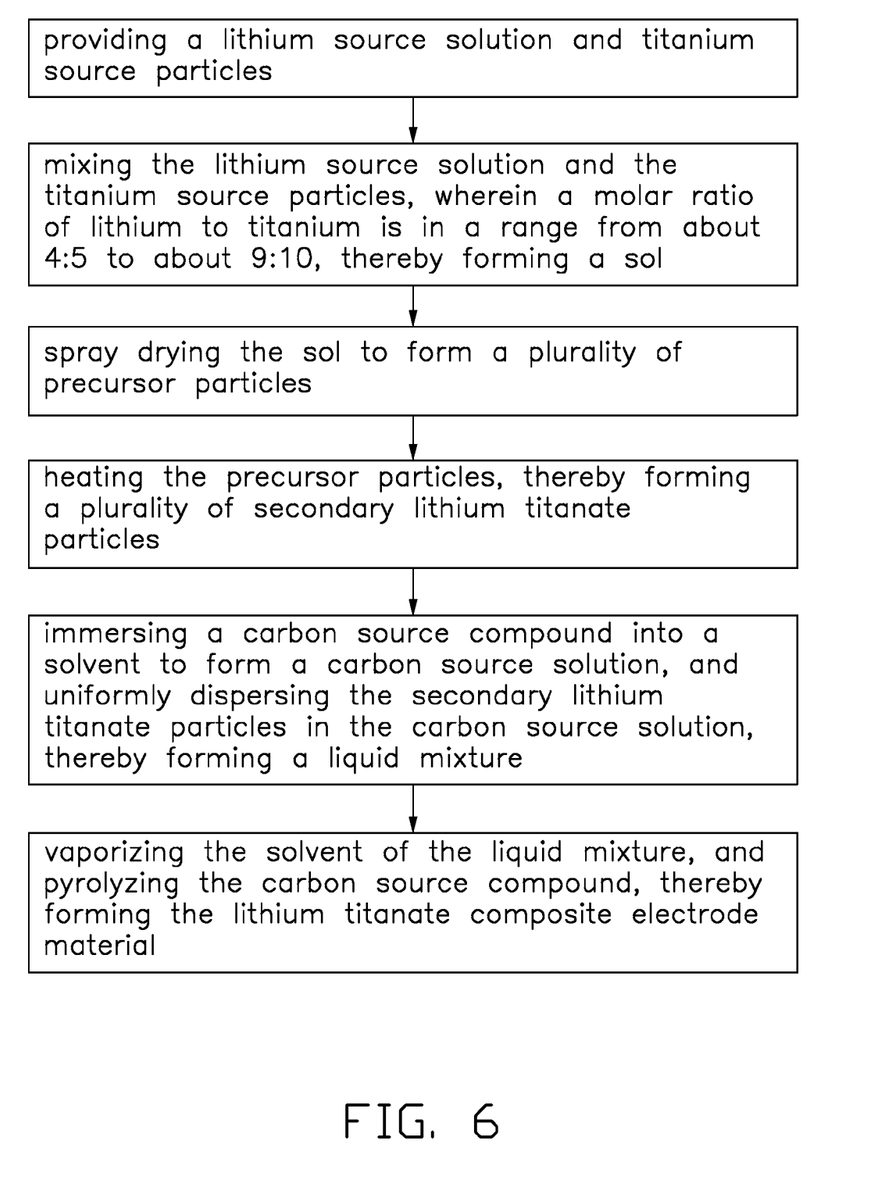
FIG. 6 is a flow chart of another embodiment of a method for making a lithium titanate composite electrode material.

Referring to FIG. 6, another embodiment of a method for making a composite lithium titanate electrode material includes the steps of:

M1, providing a lithium source solution and titanium source particles;

M2, mixing the lithium source solution and the titanium source particles, wherein a molar ratio of lithium to titanium is in a range from about 4:5 to about 9:10, thereby forming a sol;

M3, spray drying the sol to form a plurality of precursor particles;

M4, heating the precursor particles, thereby forming a plurality of secondary lithium titanate particles.

M5, immersing a carbon source compound into a solvent to form a carbon source solution, and uniformly dispersing the secondary lithium titanate particles in the carbon source solution, thereby forming a liquid mixture; and M6, vaporizing the solvent of the liquid mixture, and pyrolyzing the carbon source compound, thereby forming the lithium titanate composite electrode material.

Figure 7:
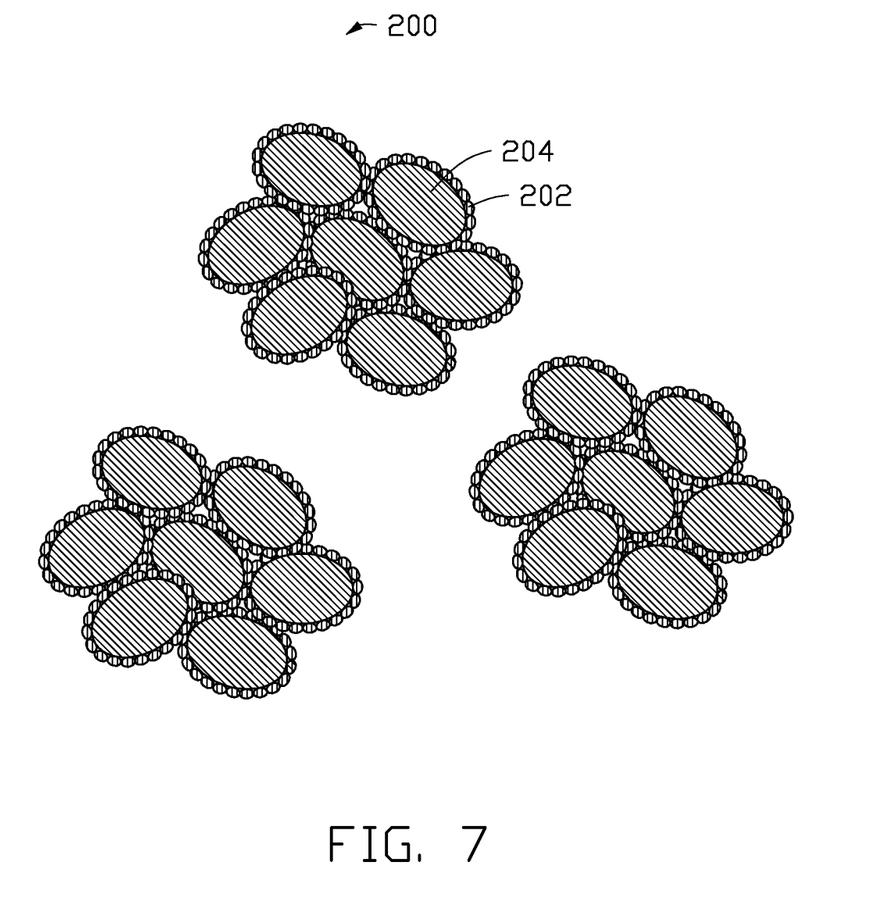
FIG. 7 is a structural schematic view of precursor particles made using the method of FIG. 6.

The steps M1 and M2 are the same as the steps S1 and S2. Referring to FIG. 7, in the step M3, the sol is spray dried to form the plurality of precursor particles 200. In one embodiment, the titanium source particles are titanium dioxide particles 204, and the lithium source solution is a lithium hydroxide solution. Each of the precursor particles 200 includes a plurality of titanium dioxide particles 204. Surfaces of each of the titanium dioxide particles 204 are uniformly coated by a plurality of lithium hydroxide particles 202. A plurality of interspaces is defined between the titanium dioxide particles 204, thus, each of the precursor particles 200 has a porous spherical structure. In addition, the process of spray drying is the same as described for the step S4.

In step M4, the precursor particles 200 are heated in an inert gas from about 1 hour to about 20 hours at a temperature in a range from about 100 degrees Celsius to about 1000 degrees Celsius. In one embodiment, the heating temperature is about 700 degrees Celsius, and the heating time is about 10 hours. In the heating process, the titanium dioxide particles 204 and the lithium hydroxide particles 202 in the precursor particles 200 can react to form a plurality of nanoscale lithium titanate particles, thereby forming a plurality of secondary lithium titanate particles. The secondary lithium titanate particles have porous spherical structures similar to the precursor particles 200. Specifically, each of the secondary lithium titanate particles includes a plurality of nanoscale lithium titanate particles. A plurality of interspaces is defined between the lithium titanate particles. The secondary lithium titanate particles can be directly used as electrode active material.

In step M5, the carbon source compound can be a reductive organic compound and can be dissolved in water, and the carbon source compound can be pyrolyzed to form a carbon residue. The carbon source compound can be saccharose, dextrose, phenolic resin, polyacrylic acid, polyacrylonitrile, polyethyleneglycol, or polyvinylalcohol. In one embodiment, the carbon source compound is saccharose. A quantity of the saccharose can be set as a molar ratio of about 1:10 to about 2:1, of the carbon element of the carbon source compound to the titanium element of the titanium source particles. The solvent can be water, ethanol, or acetone. To avoid the introduction of impurities, the water can be distilled water or deionized water. In one embodiment, the solvent is deionized water. The carbon source solution can coat the nanoscale lithium titanate particles in the secondary lithium titanate particles, because the carbon source solution can infiltrate into the interspaces between the nanoscale lithium titanate particles. The concentration of the carbon source solution should not be too high or too low. If the concentration of the carbon source solution is too great, the secondary lithium titanate particles may not be uniformly dispersed in the carbon source solution, and the viscosity of a high concentration carbon source solution would be too great. Accordingly, the fluidity of the carbon source solution would be too low. As a result, the carbon source solution may not sufficiently infiltrate into the interspaces, and the surfaces of each of the lithium titanate particles may not be sufficiently coated by the carbon source solution. If the concentration of the carbon source solution is too small, the surfaces of each of the nanoscale lithium titanate particles may not be sufficiently coated by a carbon layer formed by the step M6. The concentration of the carbon source solution can range from about 10% to about 40%. In one embodiment, the concentration of the carbon source solution is about 10%.

Furthermore, a surface modifier can be added into the carbon source solution. A weight of the surface modifier is about 0.01% to about 0.1% of that of the carbon source compound. The surface modifier is an oil-in-water emulsifier. In one embodiment, the surface modifier is Tween 80 or Span 80. The surface modifier can modify the surface of each of the secondary lithium titanate particles, accordingly, the secondary lithium titanate particles can be uniformly dispersed into the carbon source solution. In addition, the carbon source solution with the secondary lithium titanate particles can be further agitated mechanically, magnetically, or by supersonic dispersion.

in step M6, the solvent can be vaporized by heating it in a water bath or oil bath at a temperature below about 200 degrees. The carbon source compound can be adsorbed on the surfaces of each of the lithium titanate particles of the secondary lithium titanate particles, as the solvent is gradually vaporized.

The secondary lithium titanate particles coated by the carbon source compound, are heated in an inert gas. The heating time can range from about 4 hours to about 20 hours. The heating temperature can range from about 400 degrees Celsius to about 1000 degrees Celsius. In one embodiment, the heating temperature is about 700 degrees Celsius, and the heating time is about 6 hours. In the heating process, the carbon source compound distributed in the secondary lithium titanate particles is pyrolyzed to form a carbon layer coating the surfaces of each of the nanoscale lithium titanate particles of the secondary lithium titanate particles. Thus, a lithium titanate composite electrode material is formed.

In the above embodiments, a solid-liquid sol mix is formed, thus, the lithium source solution, the titanium source particles, and the carbon source compound of the sol mix can be uniformly mixed in atomic scale. Thus, the carbon layer formed by pyrolyzing the carbon source compound uniformly coats the surfaces of the lithium titanate particles, thereby improving the conductivity and the electrochemical property of the lithium titanate composite electrode material. In addition, the plurality of precursor particles formed by spray drying are porous, so accordingly, the lithium titanate composite electrode material is porous, thereby increasing moving paths of lithium ions and the effective reaction area of the lithium titanate composite electrode material. Thus, a reversible electrochemical property is improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making an electrode material of lithium-ion battery, comprising:
    providing a lithium source solution and a plurality of titanium source particles;
    mixing the lithium source solution and the plurality of titanium source particles, wherein a molar ratio of lithium element to titanium element is in a range from about 4:5 to 9:10, thereby forming a sol;
    spray drying the sol to form a plurality of precursor particles, wherein the spray drying comprises following substeps:
        filling the sol into a spray dryer by a peristaltic pump, wherein a temperature of a hot air in the spray dryer ranges from about 200 degrees Celsius to about 400 degrees Celsius;
        atomizing the sol in the spray dryer under an air pressure, thereby forming a plurality of vaporific liquid drops; and
        heating the vaporific liquid drops in the hot air, wherein the temperature of the hot air after forming the precursor particles ranges from about 50 degrees Celsius to about 150 degrees Celsius;
    heating the plurality of precursor particles, thereby forming a plurality of secondary lithium titanate particles;
    immersing a carbon source compound into a solvent to form a carbon source solution, and uniformly dispersing the plurality of secondary lithium titanate particles into the carbon source solution by agitating, thereby forming a liquid mixture, a concentration of the carbon source compound in the carbon source solution ranges from about 10 wt % to about 40 wt %; and
    vaporizing the solvent of the liquid mixture, and pyrolyzing the carbon source compound.

2. The method as claimed in claim 1, wherein the step of heating the plurality of precursor particles is processed in an inert gas.

3. The method as claimed in claim 2, wherein the heating temperature ranges from about 100 degrees Celsius to about 1000 degrees Celsius, and the heating time ranges from about 1 hour to about 20 hours.

4. The method as claimed in claim 1, wherein the step of pyrolyzing the carbon source compound comprises heating the secondary lithium titanate particles at about 400 degrees Celsius to about 1000 degrees Celsius for about 4 hours to about 20 hours.

5. The method as claimed in claim 1, wherein the lithium source solution is formed by dissolving a lithium salt or lithium hydroxide in a solvent.

6. The method as claimed in claim 1, wherein the plurality of titanium source particles comprises at least one of titanium dioxide particles, hydrated titanium dioxide particles, and hydroxy titanium oxide particles.

7. The method as claimed in claim 6, wherein a diameter of each of the titanium source particles ranges from about 50 nm to about 50 μm.

8. The method as claimed in claim 1, wherein the dispersing the plurality of the secondary lithium titanate particles into the carbon source solution comprises adding a surface modifier into the carbon source solution.

9. The method as claimed in claim 8, wherein a weight of the surface modifier is about 0.01% to about 0.1% of that of the carbon source compound.

10. The method as claimed in claim 1, wherein the air pressure ranges from about 0.05 MPa to about 0.2 MPa.

11. A method for making an electrode material of lithium-ion battery, comprising:
    providing a lithium source solution and a plurality of titanium source particles;
    mixing the lithium source solution and the plurality of titanium source particles, wherein a molar ratio of lithium element to titanium element is in a range from about 4:5 to 9:10, thereby forming a sol;
    spray drying the sol to form a plurality of precursor particles;
    heating the plurality of precursor particles, thereby forming a plurality of secondary lithium titanate particles;
    immersing a carbon source compound into a solvent to form a carbon source solution, and uniformly dispersing the plurality of the secondary lithium titanate particles into the carbon source solution, thereby forming a liquid mixture, a concentration of the carbon source compound in the carbon source solution ranges from about 10 wt % to about 40 wt %; and
    vaporizing the solvent of the liquid mixture, and pyrolyzing the carbon source compound.

* * * * *